Nov. 16, 1937.   N. B. LUND   2,099,654
SEDIMENTATION APPARATUS
Filed April 12, 1933   6 Sheets-Sheet 1

INVENTOR.
NELS B. LUND
BY Arthur Middleton
ATTORNEY.

INVENTOR.
NELS B. LUND
BY
ATTORNEY.

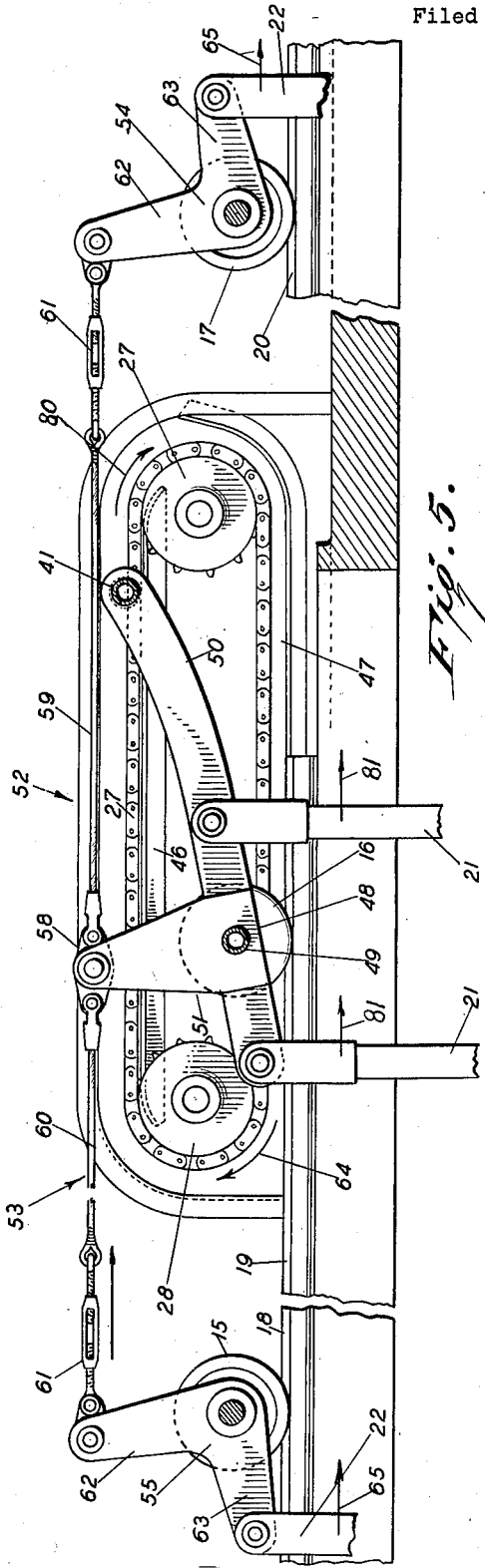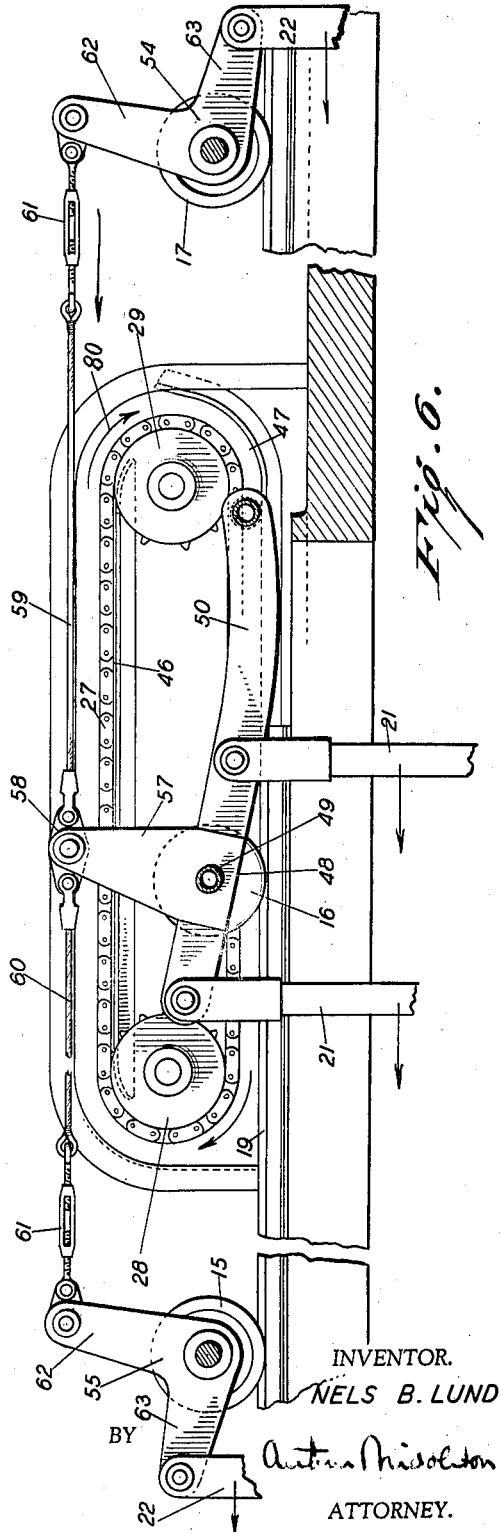

Nov. 16, 1937.　　　　　N. B. LUND　　　　　2,099,654
SEDIMENTATION APPARATUS
Filed April 12, 1933　　　6 Sheets-Sheet 5

INVENTOR.
NELS B. LUND
BY
ATTORNEY.

Nov. 16, 1937.   N. B. LUND   2,099,654
SEDIMENTATION APPARATUS
Filed April 12, 1933   6 Sheets-Sheet 6
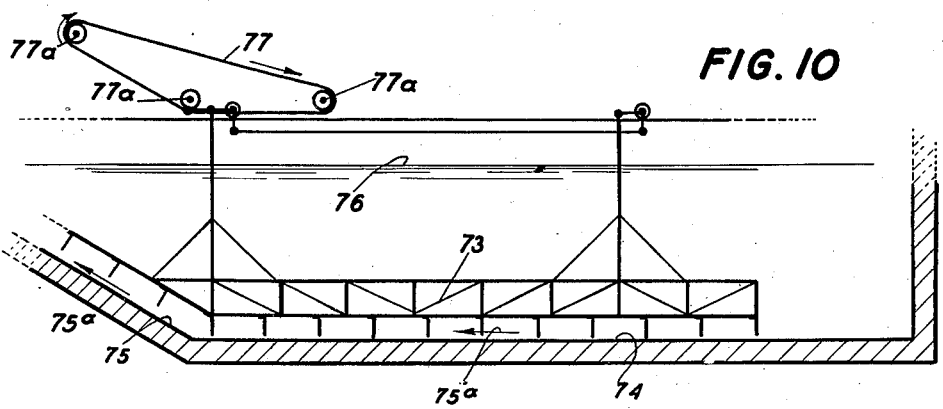
FIG. 10
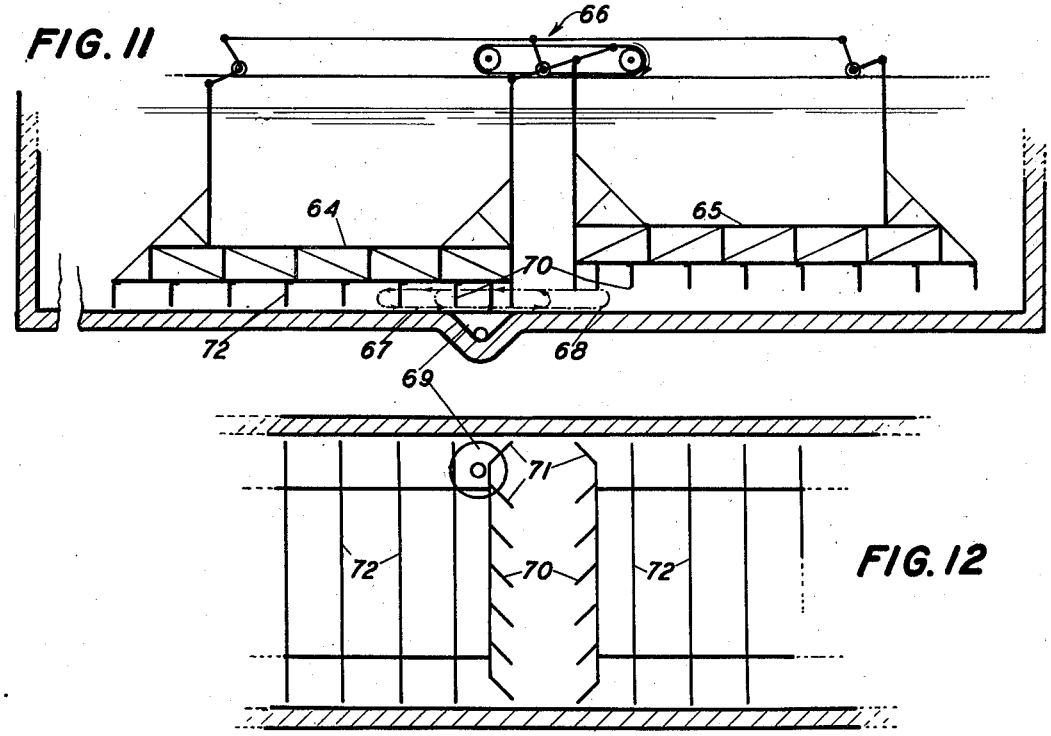
FIG. 11
FIG. 12
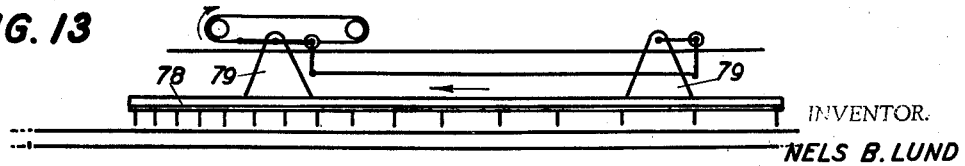
FIG. 13
INVENTOR.
NELS B. LUND
BY
ATTORNEY.

Patented Nov. 16, 1937

2,099,654

UNITED STATES PATENT OFFICE 2,099,654

SEDIMENTATION APPARATUS

Nels B. Lund, Seaford, N. Y., assignor to The Dorr Company, Inc., New York, N. Y., a corporation of Delaware Application April 12, 1933, Serial No. 665,658

16 Claims. (Cl. 210—3)

This invention relates to conveying mechanism for sedimented solids and more particularly to that type of mechanism which operates in reciprocating fashion in connection with rectangular tanks. One object of the invention is to produce a large capacity sludge collecting or conveying mechanism which is powerful and efficient in its operating stroke and is positive in function. Another object is to devise such a mechanism that is economical both in its construction and operation. A further object is to devise a sludge raking mechanism for rectangular tanks which can be used in tanks which are covered or have a top. A still further object is to produce a drive or head motion for reciprocating the sludge rake structure or conveyor in a cyclic path, that lends itself to or permits the use of, a rake structure of any desired length. Another object is to produce a reciprocable rake structure that is foolproof in that it has no sensitive parts and that it has no submerged bearings.

To this end the invention contemplates improvements in the way of reciprocating sludge rakes. One feature, therefore, resides in a rake actuating mechanism which is distinguished by the novel arrangement of an endless master flexible driving element or chain to control a closed cyclic path of the rake movement. It has been found that this arrangement, particularly due to the character of its raking stroke, is an efficient one for the purpose in question, and it is thus to be distinguished from crank actuated rakes. Due to the novel chain arrangement, the design of the rake actuating mechanism is flexible as will be seen hereinafter, and is readily adaptable to the purpose in question. It permits correlation to greatest advantage of such variables as the length of the raking stroke to other structural items, including rake length, number of blades etc.

The rake member or structure is supported fore and aft from the top of the tank, and is adapted to move stepwise the sludge load towards the sludge discharge or exit. The movements of the rake suspension points are coordinated by a suitable drive mechanism which is of the type to impart a positive cyclic movement to one point, the so-called head motion, while the second suspension point is given a suitably timed corresponding vertical component movement. Thus the rake as a whole moves uniformly through the operating cycle, imparting stepwise progressive movement to the sediment or sludge. Broadly, the rake structure is positive in action and has the high load capacity desired. A relatively large operating base or wheelbase as represented by the spacing of the rake suspension points is conducive to the positive character of the operation.

A preferred embodiment comprises a twin rake arrangement, altho a single rake structure can be used. In that embodiment, two rake members are arranged oppositely, that is to say, end by end, and provided with a common head motion control which is in the form of the master chain, characterized above. The rakes are controlled in a manner to cause the sediment to be conveyed from each end of the tank to an intermediate point of discharge.

Important features lie in the manner of cooperative association of the twin rakes. One of these features, of a purely kinematic character, requires that, while one rake proceeds in its operative stroke upon the sludge towards discharge, the associated rake retreats in raised position from the discharge. The raking cycle is repeated as the rakes operate in such counter-current alternating fashion relative to the sludge outlet.

According to another feature, the weight of one rake is balanced against the weight of the other, through the medium of a double armed lever or scale-beam. Hence the lever or scale-beam supports adjacent or inner suspension points of the two rakes, and the movement of that lever is controlled by the chains or master drive as characterized above.

Another feature of the twin rake arrangement lies in a peculiar method of composite rake action according to which it is possible to move sludge out of dead corners or areas into a more or less constricted outlet. This is accomplished by allowing the paths of the rakes to overlap each other as they alternately sweep over the discharge zone. For the purpose of definition, the area of overlapping may hereinafter be called the discharge zone.

This rake action is produced by a special arrangement of raking blades. The bulk of the sludge is moved longitudinally in the tank by a suitable number of screeds or raking blades which are equi-distantly mounted upon the rake structure. At the outlet end of the rake however there is provided a series of squeegees whose function is to give the sludge a lateral impulse in the discharge area. A scoop member cooperatively associated with squeegees is designed to receive the sludge from the squeegees and to deliver it directly, into the outlet. The sludge may be ploughed or worked back and forth by the alternating rake action in the discharge area. Such reciprocation will shift the sludge from a neutral or dead zone to the point of discharge.

The invention possesses other objects and features of advantage some of which with the foregoing will be set forth in the following description. In the accompanying drawings, there has been illustrated the best embodiment of the invention known to me, but such embodiment is to be regarded as typical only of many possible embodiments and the invention is not to be limited thereto. In the drawings:

Figs. 5 and 6 are enlarged detail views of Fig. 1 showing different operating positions of the master drive for the twin rakes.

Figure 7:
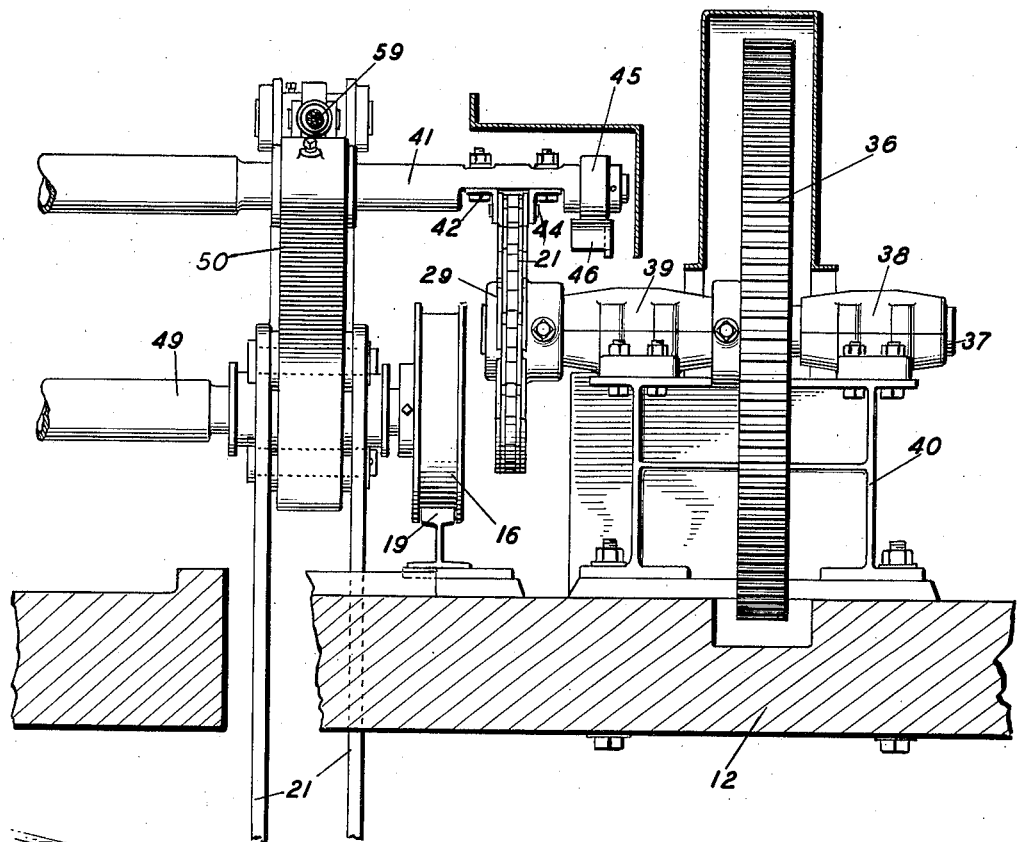
Figure 8:
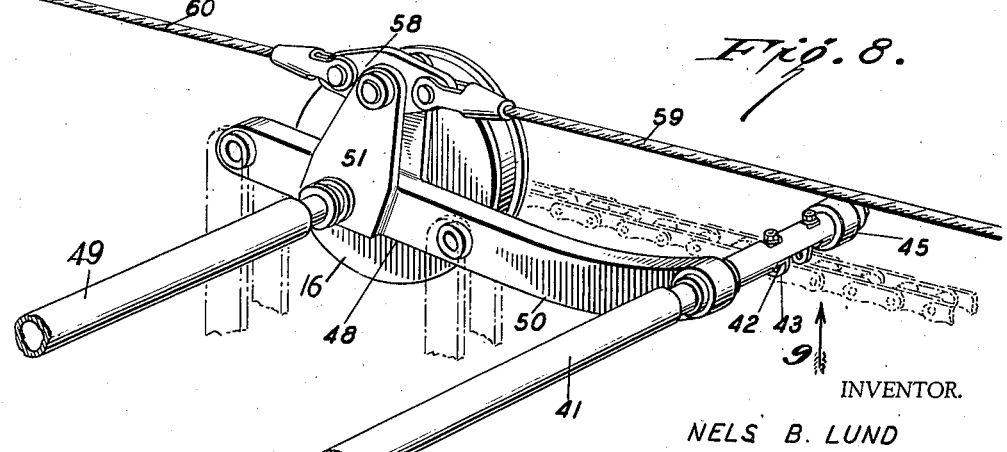

Figs. 7 and 8 further illustrate the driving mechanism.

Fig. 9 shows the connection between the rake and the chain.

Fig. 10 shows diagrammatically a special rake member operating in a substantially triangular path.

Figs. 11 and 12 constitute a diagrammatic showing of the arrangement and operation of the twin rakes in elevation and plan view relative to the sludge outlet.

Fig. 13 shows the use of an ordinary conveying rake member together with the improved actuating mechanism.

Figure 1:
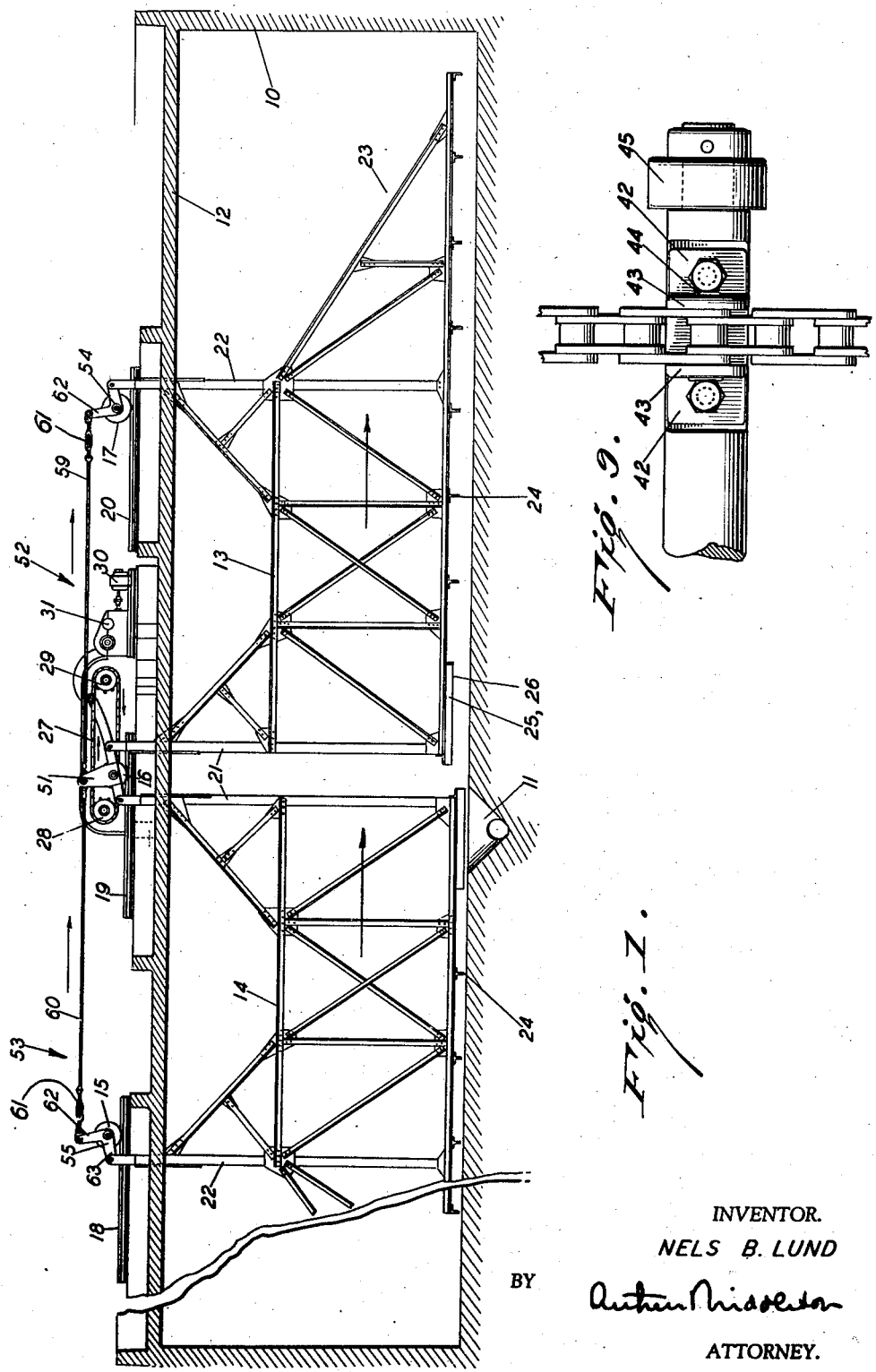
Fig. 1 is an elevational section of the tank showing the master chain for actuating the twin rakes.

Fig. 1 shows the preferred embodiment of this invention in the form of the twin rake arrangement. A tank 10 as shown has a centrally located sludge discharge or outlet 11 and a top structure 12 from which are operatively supported, the rakes or rake structures or sludge impelling structures 13 and 14. The rake structures or rakes are arranged end by end and have supporting rollers 15, 16 and 17 and may operate upon corresponding track portions 18, 19 and 20. The rake structure is shown to consist of steel framework or trestlework. Each rake has a pair of front and rear hangers or suspended portions 21 and 22, respectively, and is shown to have an overhanging portion 23 forming its outer end. Each rake has a number of squarely arranged sludge collecting blades or screeds 24 effective to move the bulk of the sludge in rectilinear fashion.

At the inner end of the rake, however, the blade arrangement is modified in order to give the sludge a lateral impulse as it approaches the outlet 11. For this reason, the inner end of each rake carries instead of a plain screed, a number of squeegees 25 or inclined blades or the like with which is associated and cooperates a scoop member 26 (more clearly shown in Figs. 11 and 12). The squeegees and their function cannot be clearly seen from Fig. 1 and are therefore illustrated in the diagrammatical Figs. 11 and 12 as hereinafter described. The area in which the sludge is thus given a composite movement towards the point of discharge, may hereinafter be called the sludge discharge zone. This discharge zone extends substantially transversely of the tank, and in it the sludge in effect is caused to converge upon the sludge outlet constituting what may be called a point of sludge discharge or focal center for sludge removal. Consequently and more generally it can be said that an elongated or longitudinal type tank to be equipped with a twin raking or sludge removal device of an alternating character as herein described, should be designed to have a bottom sludge outlet located in what may be called a sludge discharge section extending substantially transversely of and intermediate the ends of the tank and spaced from the tank ends, so that in effect through the alternating operation of the raking members or structures or sludge collectors of the device settled sludge is conveyed from both ends of the tank over the respective end portions of the bottom into the intermediate sludge discharge section and hence to and into the sludge outlet therein.

For definition of terms, the travelling squeegees 25 represent elements effective to move the sludge forwardly and laterally with respect to their path of travel. The screeds 24 are members which function to carry the sludge in a direction forwardly in the direction of their path of travel. While these specific elements have been disclosed it should be understood that various suitable equivalents may be used in their stead.

The actuating mechanism for reciprocating either the twin rake arrangement or a single one is of the type where one end of the rake has imparted to it a positive cyclic motion or head motion, while the other end of the rake is given a corresponding vertical component movement so that the rake as a whole is given the desired cyclic movement.

Figure 2:
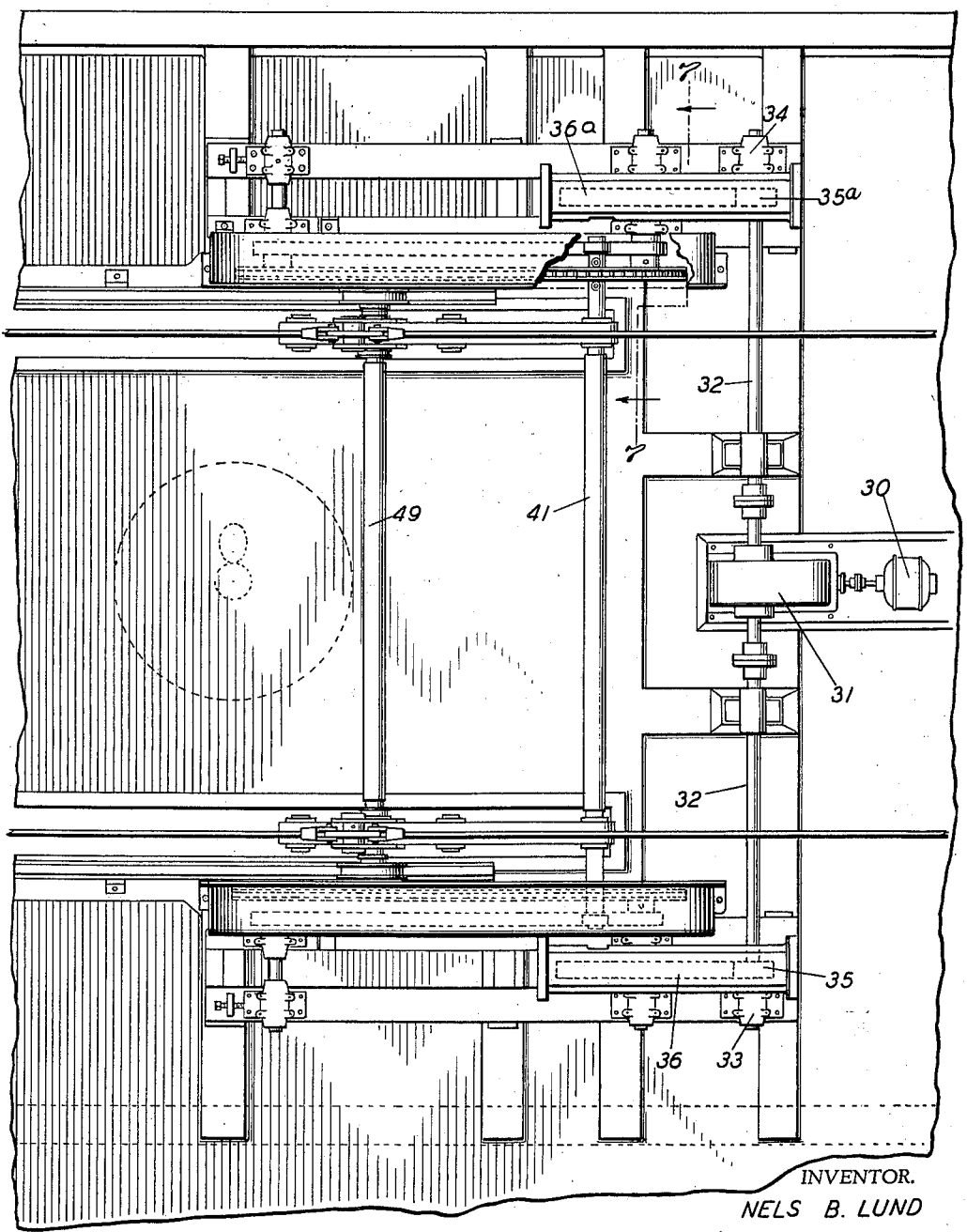
Fig. 2 is a plan view upon the actuating mechanism.

The head motion of the rakes is produced by an endless chain or other flexible medium 27 running over sprockets 28 and 29. (See also Figs. 5 and 6.) From Fig. 2 it can be seen that one chain is arranged for each side of the mechanism, and that both operate in an identical manner, as they are driven from a common motor 30 through a reduction gear or speed reducing unit 31 from which extends shafting 32 crosswise of the tank.

Each end of the shaft 32 has a bearing or journal 33 and 34, and carries adjacent to the bearing a small gear 35 and 35a, respectively, which in turn meshes with a larger gear 36 and 36a, respectively. The larger gear is fixed upon a shaft 37 (see Fig. 7) which rotates in the journals 38 and 39, the gear being arranged between the journals. Together with the gear 36 rotates the driving sprocket 29 which actuates the chain, and it is noted that the shaft has a free inner projecting portion upon which the sprocket is seated. The mechanism is shown to be mounted upon a base 40 which in turn is shown to be anchored upon the top structure 12 of the tank.

The mechanism so far described constitutes the stationary part of the mechanism and covers the elements from the motor 30 to the chain 27. The following will cover the connecting members between the chain and the rake structure proper, and they form together with the rakes the bodily moving part of the mechanism. The views in Figs. 5, 6, 7, 8 and 9 illustrate these details.

Figure 3:
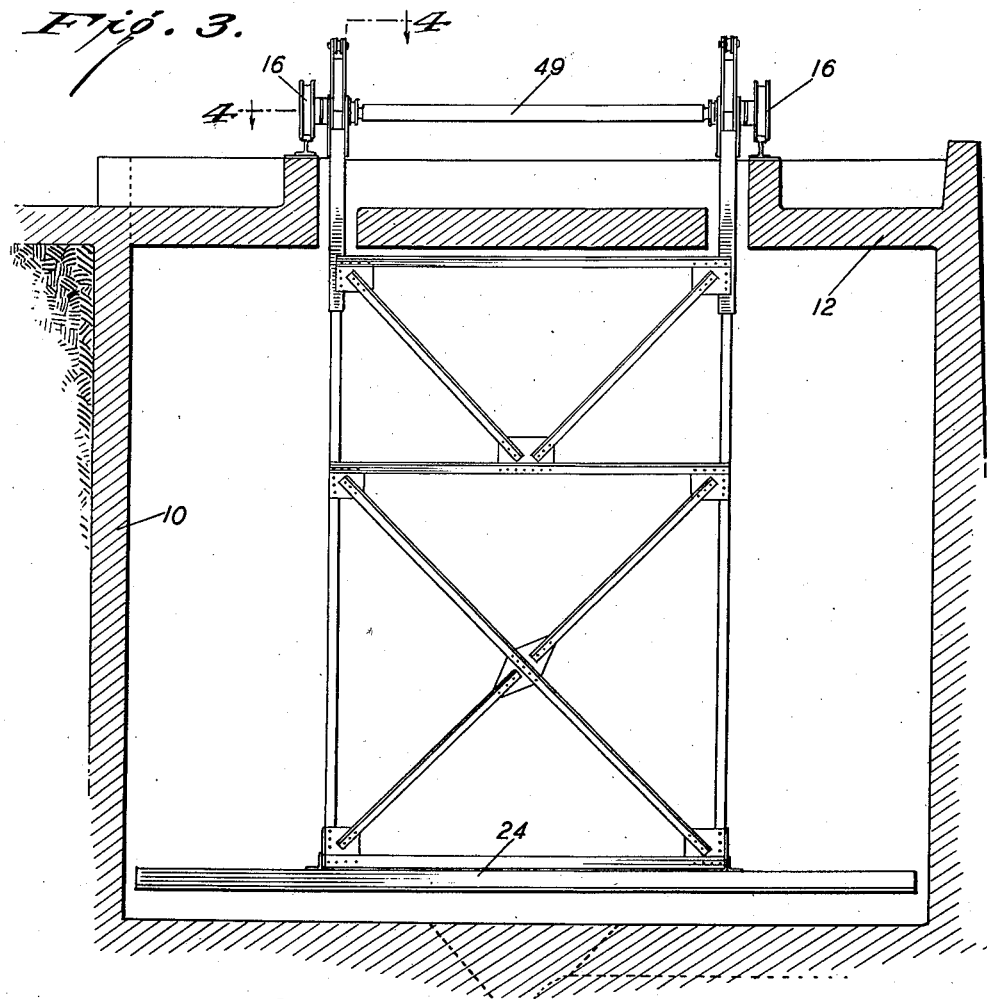
Fig. 3 is a cross-section showing top structure of the tank.

From Figs. 1 and 3, it is noted that the rake structure comprises a substantially box-like frame structure which is suspended at each side from the top of the tank. The rakes project laterally beyond that structure as shown in Fig. 3. Each side of the rake has its separate driving chain 27, both chains, however, are controlled from the central motor 30 so that the driving arrangement as a whole is of symmetrical character.

A rod 41 (see Figs. 2 and 7) connects the stationary part with the bodily moving part of the entire mechanism. The rod 41 is arranged crosswise or transversely of the tank. Each end portion of the rod is associated with a chain 27 and pivotally connected thereto substantially as illustrated in Figs. 7, 8 and 9. As a means of connection, the rod carries clips or brackets 42 having ears 43 in which a chain bolt 44 may be anchored. Each extreme end of the rod 41 also carries a guide roller 45 which may engage upon guide rails 46 and 47, (see Figs. 5, 6, and 8). This guide arrangement makes the head motion of the rakes definitely positive, allowing the chain merely to exert the pull, as will be made more clear hereinafter.

The rakes are arranged end by end in the tank. Through their hangers 21 and 22, respectively, the rakes are suspended from a system of levers which are rotatable as well as bodily reciprocatable along stationary guides or tracks upon the tank.

The inner hangers 21 of the rakes are operatively associated or coupled through a common suspension member which is in the form of double-armed lever or scale beam 48, one lever 48 of course being provided for each side of the rakes, both levers being fulcrumed upon a shaft 49 extending crosswise of the tank. The shaft 49 in turn is movably supported upon the rollers 16 operating upon the rail members 19. The hangers 21 are equidistantly spaced from the shaft 49 and thus preferably balanced against each other. Each lever 48 has an extended portion 50 to carry thereon the rod 41, so that the movement of the lever 48 is controlled by the movement of the chains 27.

Figure 4:
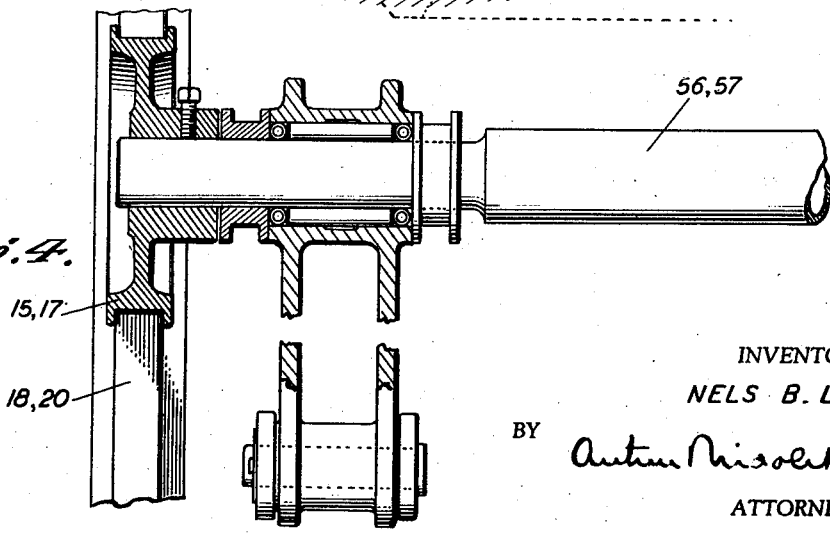
Fig. 4 is a detail section in plan view upon the motivating arrangement of the rear rake hanger.

The kinematics of the chain-controlled levers 48 are such as to furnish the desired positive cyclic movement or head motion for the associated inner ends of the rakes. The outer ends of the rakes are controlled in unison with the inner ends through arms 51 fixed upon the levers 48 at right angles thereto. The arms 51 have transmitting or reach connections 52 and 53 (see Fig. 1), respectively, with bellcrank levers 54 and 55. A detail of the bellcranks 54 or 55 is shown in Fig. 4, indicating that pairs of bellcranks are mounted upon transverse shafts 56 and 57, respectively, which in turn are bodily movable by virtue of the track rollers 15 and 17 mounted upon the free ends of the shafts. Details of the transmitting connections 52 and 53 which impart component movement to the outer ends of the rakes can be seen from Figs. 5, 6 and 8. The arm 51 is shown to be bifurcated and carries between its prongs or shanks a swivel member 58. Each end of the swivel member serves as a connection for a tie or tension wire 59 and 60, respectively. Each tension wire is shown to connect preferably through turnbuckles 61 or the like with one arm 62 of the bellcranks 54 and 55, respectively. The other bellcrank arm 63 carries the outer rake hanger 22.

The mechanism which includes the bellcranks 54 and 55 just referred to provides what may be viewed as a parallel motion mechanism by which the rake structure which has substantially longitudinal extent is bodily positioned toward and from the tank bottom but so that the several raking elements of the rake structure maintain equal vertical distances or positions relative to the tank bottom.

The cooperation of the twin rake members with regard to sludge removal is more clearly shown in the diagrammatic Figs. 11 and 12. Fig. 11 is an elevational view of rake members 64 and 65 and a drive arrangement indicated collectively by the numeral 66. At 67 and 68 are indicated in dotted lines the overlapping cyclic paths of the rake members and their relation to a sludge outlet 69 which in Fig. 11 is shown to be located near one wall of the tank. Squeegees or inclined ploughing blade members and scoop member are shown at 70 and 71, respectively. Screeds or raking blade means 72 move the bulk of the sludge in rectilinear fashion into the range of the squeegees and scoop member respectively.

Fig. 10 is a modification which illustrates the fact that the novel type of chain drive for the rake member is adaptable to a variety of types of raking strokes. In Fig. 10 advantage is taken of this adaptability in order to actuate a rake member 73 of peculiar novel shape. The shape of the rake corresponds to the shape of the tank which has a horizontal bottom portion 74 continuing into an upward sloping deck 75 at one end of the tank. Proper actuation of the rake will convey the solids stepwise over the bottom 74 and directly on and up the sloping deck 75 to a point above the level of the liquid in the tank, the level being indicated at 76. The direction of the sludge movement is indicated by arrows 75a. The rake member 73 is given the proper movement by an endless chain 77 which is arranged substantially in triangular fashion in that it runs over three sprockets 77a one which of course is a driving sprocket.

Fig. 13 conveys the idea that the improved actuating mechanism or chain drive can be used with ordinary conveying rakes in arrangements other than sedimentation tanks. A rake 78 is here shown to have short hangers 79 corresponding to a relatively shallow depth of the tank. Accordingly, the actuating mechanism is placed closer to the tank bottom, and the pull of the chain is thus allowed to act more directly upon the rake load.

The operation of the apparatus is as follows:
Solids in suspension in the liquid being treated settle upon the bottom of the tank, where the sludge rakes or rake structures 13 and 14 operate to convey them in stepwise or intermittent progressive movement to the settled solids or sludge outlet 11 located in the central portion of the tank. The rakes are coupled and controlled by a central drive in such a fashion that one rake is lowered and operative to convey sludge to the outlet, while the other rake recedes from the outlet in raised or inoperative position. This operating cycle is maintained by attaching the inner hangers 21 of the rakes to the scale beam or lever 48 which in turn is controlled through the rod 41 by the revolutions of the chains 27.

The movements of the chains 27 thus give the rakes their head motion as more clearly illustrated in the detail Fig 5 and 6. The chain rotates constantly in the direction indicated by the arrow 80, so that lever 48 is caused to alternate between two tilted positions. In Fig. 5 the extension 50 of the lever is tilted up and the lever travels bodily with the upper strand of the chain, thereby moving both rakes unitarily towards the right as indicated by arrow 81. During that part of the cycle the rake 14 is lowered and operative to convey sludge to the outlet 11, while the other rake 13 is inoperative and travels in raised position away from the sludge outlet.

In Fig. 6 the lever has been tilted down due to further travel of the chain and the lever 48 now moves bodily with the lower strand of the chain and accordingly reverses the operativeness of the rakes, in that now rake 13 is lowered pushing sludge towards the outlet 11 while the rake 14 in raised position moves away from the outlet.

It is clear from the drawings that the movement which is imparted to the inner rake hangers as head motion is identically set up at the outer hanger 22 through the transmittal of the proper vertical component movement from arms 51 of the master lever 48 through connections 59 and 60 and the bellcranks 54 and 55, respectively. Naturally, a constant repetition of the cycle causes the sludge from both ends of the tank to intermittently move towards the outlet.

It is noted that the cyclic head motion of the rakes is rendered definitely positive by allowing the rollers 45 of the rod 41 to engage upon guide rails 46 and 47. It is a feature of the present embodiment that the weights of the rakes are balanced against each other so that these guide rails do not have to sustain the weight of the rakes, but merely differences in the weights of the rakes, if any, or else merely a certain small mechanical resistance.

The special method of sludge removal in the discharge zone by the twin rakes is seen from Figures 11 and 12. Sludge is brought into the range of action of the squeegees 70 by the screeds 72. As the sludge is caught by the squeegees or inclined blades it enters the sludge discharge zone and is given a lateral impulse by the squeegees which brings the sludge somewhat closer to the outlet 69. This action is repeated upon the sludge as the associated rake becomes effective in the opposite direction, giving the sludge in the discharge zone an additional push towards the outlet 69. Such reciprocation of the rakes will therefore bring the sludge from certain dead areas in the discharge zone into the range of the scoop member 71 and eventually into the outlet 69. Viewing the present mode of sludge conveyance and removal more broadly it can be said that the sludge is conveyed from diverse points of the tank bottom to a restricted locality, that is to say, is in effect caused to converge from diverse points of the bottom upon the sludge outlet as a focus.

The operation of the modified arrangement as shown in Fig. 10 is more or less self-explanatory. The path of the rake member again is similar to the path of the chain 77. Accordingly, the horizontal portion of the rake member is effective to rake the sludge stepwise over the bottom of the tank to the sloping deck where the sloping portion of the rake member continues the movement of the sludge, conveying the same upwardly thereon to a point above the liquid level where it can be disposed of in any suitable manner. This arrangement of sludge removal differs from the one shown in Fig. 1, in that the sediments are obtained in a drained condition as they emerge from the liquid upon the sloping deck.

The master chain of the improved actuating mechanism produces an even and powerful raking stroke of a desired length. The effectiveness of this stroke is still more emphasized in Fig. 13 where the actuating mechanism is placed closer to the bottom of the tank due to the shorter length of the rake hangers and where accordingly the pull of the chain is transmitted more directly to raking blades and the sludge load.

It should also be noted that the general arrangement of the rake driving mechanism as disclosed in the drawings makes it possible to provide the tank with a top in order to prevent freezing of the liquid therein. The structure which supports the actuating mechanism may then equally serve as a top. Clearly, there are merely a number of narrow slot-like openings required in the top to allow passage therethrough of the rake hangers.

More explicitly, a problem resides in the method of structurally arranging and operating the roller supported rakes with regard to the top structure or tank cover. That is to say, in arranging a covered tank of the type disclosed there is the difficulty of providing sufficient self-supporting strength for the top so that it may sustain itself upon the tank walls while at the same time openings must be provided in the top through which may pass the suspension elements of the raking member to operate therein, and the openings should be such that the top structure be not unduly weakened. This end is attained by reducing the travelling stroke of the device as compared for instance with such long stroke devices as found in connection with sewage settling tanks or the like where a single sludge collector in the form of a single screed or blade member travels from end to end of the tank.

According to the present arrangement a rake is arranged to impel the sludge in a step-wise movement. Accordingly, the four slot-like openings for the rake hangers are short enough so that the continuity of the top structure will not be interrupted to an undue extent nor its self-sustaining and weight sustaining strength weakened.

Furthermore, the rake structure in its preferred arrangement may be considered as a four wheel carriage since it has a pair of front and a pair of rear rollers operating on tracks. Thus, in order to give the rake structure proper guidance along the tracks, the wheelbase should be large relative to the rail space. Consequently, the present arrangement offers the opportunity of supporting the rails and the weight resting thereon through the top structure upon the tank walls while the measure of the rail space is reduced to a desirable minimum smaller than the width of the tank.

The preferred embodiment also discloses a peculiar compact relationship between the tank top structure, a rake operating below the top, and a rake driving means or mechanism located directly on top of the tank cover. Specifically, this is embodied in the arrangement of the laterally and symmetrically arranged master driving chains 27 having a centrally located prime mover or motor gear aggregate 30, 31, etc.

It is a characteristic of the improved actuating mechanism that the design thereof due to the provisions of the chains 27 is rather flexible and therefore readily adaptable to the purpose in question. To express this in more concrete terms, it can be said that the chosen length of the path of the chains determines the length of the rake structure, and also determines the minimum number of raking blades, and eventually the weight of the rake structure. In consideration of all these factors optimum proportions can be chosen with regard to most efficient and economic sludge removal.

Another consideration is that idle periods in the rake movement are those where the lever 48 turns around the sprockets. In other words, a longer chain will have less idle periods than a shorter chain, so that in the unit time a relatively longer chain does more active raking than a shorter one, assuming equal speed for both. The loss of active raking effect would be quite spectacular when the elongated path of the chain were to be replaced by the circular path of a crank such as known.

It will thus be seen that this invention comprises a simple and efficient sludge raking mechanism which is useful in the raking or conveying of small sized solids along a tank bottom or deck and which is applicable to classifiers as well as clarifiers or thickeners. Obviously, some uses or embodiments of the invention may take the form of a single rake member to be cyclically reciprocated, and this is contemplated herein so long as the same type of head motion or endless chain or cable drive is used therefor.

The present type of master drive also may be effectively combined with a modified arrangement of the raking blades. A larger accumulation of settled solids may occur for instance at the outlet end of the tank. In order to handle such uneven sludge distribution, one end of the rake may be equipped with a greater number of blades than the other end. Fig. 13 therefore shows the arrangement of a progressively increased spacing between the raking blades.

I claim:

1. In combination with a sedimentation tank having a sludge outlet located in the central portion thereof, a sludge collecting mechanism comprising a pair of rake members arranged end by end, each rake member adapted to reciprocate as a whole in cyclic movement for intermittent conveyance of the sludge from one end of the tank towards said sludge outlet, and rake actuating mechanism comprising means for imparting positive uniform cyclic motion to the rake members, said actuating mechanism comprising a double armed lever having a longitudinally movable fulcrum point, each arm of said lever adapted to have suspended therefrom an inner adjoining end of a rake, driving means engaging upon one end of said lever and adapted to control bodily as well as rotary movement of said lever in a manner to produce a desired cyclic head motion of the rakes corresponding to said cyclic movement thereof, and comprising operating connections to impart vertical component movement to the outer rake ends corresponding to said head motion.

2. The arrangement according to claim 1, in which the movement of the lever is controlled by the movement of an endless chain, in that one point of the lever is connected with the chain.

3. A sludge collecting mechanism for sedimentation tanks comprising a rake structure adapted for longitudinal reciprocation in the tank, driving means for each side of the rake structure, both said driving means being identical and symmetrical and each said driving means comprising a pair of sprockets, an endless chain upon said sprockets, and driven by one of the sprockets, a gear rotating with the driving sprocket, and adapted to receive driving impulse, a single prime mover, and mechanical power transmitting connections between said prime mover and said gears.

4. A sludge collecting mechanism for sedimentation tanks comprising a rake structure for longitudinal reciprocation in the tank, a driving means for each side of the rake structure, both said driving means being identical and symmetrical and each said driving means comprising a pair of sprockets, an endless chain upon said sprockets and driven by one of the sprockets, a shaft having floatingly fixed thereon the driving sprocket, a pair of journals to carry the shaft and located outwardly of said sprocket, a gear fixed upon said shaft between said journals and adapted to receive driving impulse, a single prime mover, and mechanical power transmitting connections between said prime mover and said gears.

5. In a sludge collecting mechanism for a sedimentation tank having a sludge outlet, a reciprocating rake structure adapted to move stepwise sludge over the bottom towards said outlet, said rake structure comprising a sequence of screeds spaced from each other and effective to convey the sludge in longitudinal direction, a series of inclined blades at the outlet end of the rake effective to give lateral impulse to the sludge, and a scoop member cooperatively associated with said inclined blades to receive the sludge therefrom and effective to deliver the sludge moved by said inclined blades, in substantially rectilinear direction to and into the sludge outlet.

6. In combination with a sedimentation tank having an intermediate sludge outlet, a sludge collecting mechanism including a twin rake arrangement operating relative to said outlet, each rake structure comprising a sequence of screeds spaced from each other and effective to convey the sludge in longitudinal direction; a series of squeegees at the inner end of each rake effective to give lateral impulse to the sludge; and a scoop member cooperatively associated with said inclined blades to receive sludge therefrom and effective to deliver the sludge moved by said inclined blades, in substantially rectilinear direction to and into the sludge outlet, the two rakes cooperating in such a manner that whatever sludge is moved past the outlet by one rake is caught by the other rake in alternation.

7. In combination with a sedimentation tank having a sludge discharge located in the central portion thereof and intermediate the ends of the tank and spaced therefrom, a sludge collecting mechanism comprising a pair of rakes adapted to operate in alternating counter-current fashion, each said rake adapted to reciprocate in cyclic bodily movement for stepwise conveyance of the sludge from one end of the tank towards said sludge discharge, and rake actuating mechanism effective to impart uniform raking movement and to coordinate the movement of the rakes relative to each other and relative to said sludge outlet, said actuating mechanism comprising an endless master drive element and a weight compensating connection for the rakes between said endless master drive and said rakes.

8. A sludge collecting mechanism for sedimentation tanks, comprising a rake structure suspended into the tank, said rake structure having a pair of front and a pair of rear roller supports, a pair of track elements for the supporting rollers, a structure extending over the tank and supported from the tank walls and adapted to carry said track elements, the space between the track elements being thereby reduced relative to the tank width so as to ensure proper longitudinal guidance of the roller supported rake structure.

9. A sludge collecting mechanism for sedimentation tanks, comprising a rake structure suspended into the tank, said rake structure having a pair of front and a pair of rear roller supported suspension connections, a pair of track elements for the supporting rollers, a structure extending over the tank and supported from the tank walls and adapted to carry said track elements, the transverse space between the track elements being thereby reduced relative to the tank width so as to insure proper longitudinal guidance of the roller supported rake structure along the tracks, a separate rake driving arrangement for each side of the rake structure, said driving arrangements being identical and symmetrical, a prime mover common for both driving arrangements and located centrally thereof and also carried by said track supporting structure, and mechanical power transmitting connections between the prime mover and each of said rake driving arrangements.

10. A mechanically operated sedimentation tank comprising a tank cover structure supported from the tank walls, a sludge collector suspended into the tank and operable for reciprocating movement longitudinally of the tank, said sludge collector having front and rear suspension connections extending through corresponding slotted openings in the tank cover structure, and actuating mechanism directly associated with said tank cover structure, said mechanism comprising an endless driving chain to impart uniform elongated cyclic movement to said sludge collector.

11. A mechanically operated sedimentation tank comprising a tank cover structure supported from the tank walls, a sludge collecting rake structure suspended into the tank and operable for reciprocating movement longitudinally of the tank, said sludge rake having a pair of front and a pair of rear suspension connections extending through four corresponding slotted working openings in said tank cover structure, and actuating mechanism for the rake structure directly associated with said tank cover structure and comprising a separate endless master driving chain for each side of said rake structure to impart elongated cyclic movement thereto, and a follower connection effective to impart vertical component movement to the other rake suspension connection corresponding to the head motion imparted to said first connection.

12. In combination with a flat-bottomed sedimentation tank having a sludge outlet intermediate the ends thereof, a bodily reciprocable sludge collecting and discharging twin unit comprising a pair of sludge conveying rakes, each rake having front and rear suspension connections, said rakes to operate in counter-current fashion relative to said sludge outlet, a double-armed lever having supporting track rollers coaxial with the fulcrum point thereof, the inner ends of said rakes suspended from respective opposed portions of said lever, the outer or rear ends of said rakes also having supporting track rollers, said twin unit also comprising operating connections between said double armed lever and the rear suspension connections of the rakes, said operating connections effective to translate vertical component movement from the front end to the rear end of each rake to produce uniform bodily movement of each rake.

13. A mechanically operated sedimentation tank comprising a tank cover structure supported from the tank walls, a sludge collecting rake member suspended into the tank and operable for reciprocating movement longitudinally of the tank, said rake member having front and rear suspension connections extending through corresponding slotted openings in the tank cover structure, and actuating mechanism directly associated with said tank cover structure.

14. In a sedimentation tank having a sludge discharge located in the central portion thereof intermediate the ends of the tank and longitudinally spaced therefrom, a longitudinally movable sludge collecting mechanism comprising a pair of raking elements each having longitudinally spaced front and rear suspension points, said elements adapted to operate in alternating fashion, each said element adapted for bodily movement along a cyclic path and thereby to longitudinally reciprocate to effect stepwise conveyance of the sludge from the respective ends of the tank towards said sludge outlet, and rake actuating mechanism effective to coordinate the bodily movements of the rake elements relative to each other and relative to the sludge outlet, said actuating mechanism being in the character of a parallel motion mechanism and comprising lever means associated with each suspension point of said raking elements, and means interconnecting said lever means in a manner to balance the full weight of one rake element against the full weight of the other.

15. In a sludge collecting mechanism for a sedimentation tank, a rake structure supported from the top of the tank and having a front and a rear suspension connection, an actuating mechanism for reciprocating the rake structure by imparting thereto substantially uniform bodily movement along a non-circular closed path, which mechanism comprises an endless master drive element, and operating connections between said endless drive element and one of the rake suspension connections, effective to move said last mentioned suspension connection along a path which is substantially similar to the path of said endless drive element and a follower connection to control the other suspension connection from said endless drive element and effective to impart thereto vertical component movement, in coordination with said movement imparted by said endless master drive element.

16. In a sludge collecting mechanism for sedimentation tanks, a rake structure supported from the top of the tank and having a front and a rear suspension connection, an actuating mechanism for reciprocating the rake structure in an elongated cyclic path of bodily movement, which mechanism comprises an endless master drive element for imparting uniform raking movement, a lever element and a movable support therefor arranged to allow for bodily movement of the center of lever rotation substantially in the direction of the raking movement, said bodily movable lever arranged to transmit to one of the rake suspension connections movement from said endless master drive element in a manner to impart movement which is substantially similar to the path of said endless master drive element, and a follower connection to control the other suspension connection from said endless drive element and effective to impart thereto vertical component movement in coordination with the movement imparted by said endless master drive element.

NELS B. LUND.